US009919218B1

(12) United States Patent
Wakeford et al.

(10) Patent No.: US 9,919,218 B1
(45) Date of Patent: Mar. 20, 2018

(54) SYSTEMS AND METHODS FOR PROVIDING VIRTUAL REALITY CONTENT IN AN ONLINE GAME

(71) Applicant: Aftershock Services, Inc., San Ramon, CA (US)

(72) Inventors: Kent Wakeford, Hillsborough, CA (US); Tomi Huttula, San Rafael, CA (US)

(73) Assignee: Aftershock Services, Inc., San Ramon, CA (US)

( * ) Notice: Subject to any disclaimer, the term of this patent is extended or adjusted under 35 U.S.C. 154(b) by 200 days.

(21) Appl. No.: 15/048,958

(22) Filed: Feb. 19, 2016

(51) Int. Cl.
*A63F 9/24* (2006.01)
*A63F 13/77* (2014.01)
*A63F 13/79* (2014.01)
*G06F 3/01* (2006.01)
*A63F 13/44* (2014.01)
*A63F 13/285* (2014.01)

(52) U.S. Cl.
CPC ............ *A63F 13/77* (2014.09); *A63F 13/285* (2014.09); *A63F 13/44* (2014.09); *A63F 13/79* (2014.09); *G06F 3/011* (2013.01)

(58) Field of Classification Search
None
See application file for complete search history.

(56) References Cited

U.S. PATENT DOCUMENTS

| 5,331,353 | A | 7/1994 | Levenson | |
|---|---|---|---|---|
| 6,527,641 | B1 * | 3/2003 | Sinclair | A63F 13/12 455/456.1 |
| 6,722,984 | B1 | 4/2004 | Sweeney | |
| 6,913,536 | B2 | 7/2005 | Tomizawa | |
| 7,713,118 | B2 | 5/2010 | Roemer | |
| 8,527,332 | B2 | 9/2013 | Selby | |
| 8,814,691 | B2 * | 8/2014 | Haddick | G02B 27/017 463/30 |
| 9,205,338 | B1 | 12/2015 | Wakeford | |

(Continued)

OTHER PUBLICATIONS

The Queen's Wrath, URL: http://destiny.wikia.com/wiki/The_Queen's_Wrath [retrieved Jan. 22, 2016] 2 pgs.

(Continued)

*Primary Examiner* — Paul A D'Agostino
(74) *Attorney, Agent, or Firm* — Sheppard Mullin Richter & Hampton LLP

(57) ABSTRACT

Virtual reality content in an online game may be provided by providing access to users attempting to join a game instance via virtual reality platforms and denying access to users attempting to join the game instance via non-virtual reality platforms. Virtual reality content in an online game may be provided by requiring users playing the online game via virtual reality platforms during a time period to achieve a first objective, and requiring users playing the online game via non-reality platforms during the time period to achieve a second objective. The first objective may require interaction with the virtual reality content and the second object may not require interaction with the virtual reality content. Virtual reality content in an online game may be provided by requiring all users to achieve an objective during a time period. The objective may require interaction with the virtual reality content.

18 Claims, 7 Drawing Sheets

(56) References Cited

U.S. PATENT DOCUMENTS

| | | | | |
|---|---|---|---|---|
| 2002/0090985 | A1 | 7/2002 | Tochner | |
| 2002/0158917 | A1* | 10/2002 | Sinclair | A63F 13/12 715/850 |
| 2003/0119576 | A1* | 6/2003 | McClintic | G07F 17/32 463/20 |
| 2003/0211889 | A1* | 11/2003 | Walker | A63F 3/081 463/42 |
| 2005/0192097 | A1 | 9/2005 | Farnham | |
| 2005/0282638 | A1* | 12/2005 | Rowe | G07F 17/32 463/42 |
| 2006/0105838 | A1* | 5/2006 | Mullen | A63F 13/211 463/31 |
| 2006/0287080 | A1 | 12/2006 | Bychkov | |
| 2007/0013515 | A1 | 1/2007 | Johnson | |
| 2007/0173323 | A1* | 7/2007 | Johnson | A63F 13/12 463/42 |
| 2008/0300049 | A1 | 12/2008 | Anderson | |
| 2008/0300055 | A1* | 12/2008 | Lutnick | G06F 3/011 463/39 |
| 2009/0077463 | A1* | 3/2009 | Koster | A63F 13/10 715/234 |
| 2009/0183226 | A1 | 7/2009 | Dean | |
| 2009/0251457 | A1 | 10/2009 | Walker | |
| 2010/0046553 | A1 | 2/2010 | Daigle | |
| 2010/0056243 | A1* | 3/2010 | Czyzewski | G07F 17/3244 463/16 |
| 2010/0093434 | A1 | 4/2010 | Rivas | |
| 2010/0273557 | A1 | 10/2010 | Miyaki | |
| 2011/0118022 | A1 | 5/2011 | Aronzon | |
| 2011/0252079 | A1* | 10/2011 | Werner | H04L 29/125 709/202 |
| 2011/0264246 | A1 | 10/2011 | Pantoja | |
| 2011/0312423 | A1 | 12/2011 | Mosites | |
| 2012/0127284 | A1 | 5/2012 | Bar-Zeev | |
| 2012/0129598 | A1* | 5/2012 | Chao | G07F 17/3237 463/31 |
| 2012/0172098 | A1 | 7/2012 | Baker | |
| 2012/0244948 | A1* | 9/2012 | Dhillon | G06Q 30/0209 463/42 |
| 2012/0244950 | A1* | 9/2012 | Braun | G07F 17/3244 463/42 |
| 2012/0246301 | A1* | 9/2012 | Vyrros | H04L 45/745 709/224 |
| 2012/0258802 | A1 | 10/2012 | Weston | |
| 2012/0270623 | A1* | 10/2012 | Walker | G07F 17/32 463/12 |
| 2012/0316999 | A1 | 12/2012 | Koh | |
| 2012/0322545 | A1 | 12/2012 | Arnone | |
| 2012/0329551 | A1* | 12/2012 | Arezina | G07F 17/32 463/25 |
| 2013/0017870 | A1* | 1/2013 | Parker | G06Q 30/02 463/1 |
| 2013/0045804 | A1* | 2/2013 | Ruke | A63G 31/00 463/42 |
| 2013/0061260 | A1 | 3/2013 | Maskatia | |
| 2013/0137522 | A1* | 5/2013 | Kusano | G07F 17/3239 463/42 |
| 2013/0159519 | A1* | 6/2013 | Hochberg | G06Q 50/01 709/225 |
| 2013/0184064 | A1* | 7/2013 | Manning | G07F 17/3211 463/25 |
| 2013/0196757 | A1* | 8/2013 | Latta | A63F 13/211 463/31 |
| 2013/0225305 | A1 | 8/2013 | Yang | |
| 2014/0024445 | A1 | 1/2014 | Aller | |
| 2014/0024464 | A1* | 1/2014 | Belakovsky | A63F 13/60 463/43 |
| 2014/0028850 | A1 | 1/2014 | Keating | |
| 2014/0066176 | A1* | 3/2014 | LeTourneau | A63F 13/60 463/23 |
| 2014/0094315 | A1* | 4/2014 | Stine | A63F 13/12 463/42 |
| 2014/0113716 | A1* | 4/2014 | Mukhopadhyay | A63F 13/005 463/31 |
| 2014/0121015 | A1* | 5/2014 | Massing | G07F 17/3211 463/33 |
| 2014/0128161 | A1* | 5/2014 | Latta | A63F 13/06 463/42 |
| 2014/0192084 | A1 | 7/2014 | Latta | |
| 2014/0221084 | A1* | 8/2014 | Morrison, III | H04L 67/32 463/29 |
| 2014/0258394 | A1* | 9/2014 | Lucero | A63F 13/216 709/204 |
| 2014/0302915 | A1* | 10/2014 | Lyons | G07F 17/3225 463/25 |
| 2014/0309002 | A1 | 10/2014 | OGorman | |
| 2014/0370992 | A1* | 12/2014 | Cudak | A63F 13/795 463/43 |
| 2014/0378214 | A1* | 12/2014 | Suzuki | A63F 13/822 463/25 |
| 2015/0005052 | A1 | 1/2015 | Harrington | |
| 2015/0011277 | A1* | 1/2015 | Wakeford | A63F 13/00 463/1 |
| 2015/0080083 | A1 | 3/2015 | Tamaoki | |
| 2015/0080127 | A1 | 3/2015 | Tamaoki | |

OTHER PUBLICATIONS

Totilo, Assassin's Creed Unity Finally Drops App, Web Requirements for Unlocks [Update], Dated Feb. 18, 2015, 5pgs.

A Cautious Celebration of Pay-or-Wait to Play Games, URL: http://www.michaelbraun.me/2014/07/a-cautious-celebration-of-pay-or-wait-to-play-games [retrieved Jan. 21, 2016] 3pgs.

World of Warcraft Armory, URL: https://play.google.com/store/apps/details?id=com.blizzard.wow&hl=en [retrieved Jan. 20, 2016] 4pgs.

Companion App (iFruit)—GTA 5 Wiki Guide—IGN, URL http:www.ign.com/wikis/gta-5/Companion_App_(iFruit)) [retrieved Jan. 20, 2016] 17pgs.

The Free GTAV iFruit and Game Manual Companion Apps, URL: http://www.rockstargames.com/newswire/article/51371/the-free-gtav-ifruit-and-game-manual-companion-apps.html [retrieved on Jan. 20, 2016] 5 pgs.

FIFA 16—Companion App—EA Sports, URL: https://www.easports.com/fifa/features/companion-app [retrieved Jan. 22, 2016] 5pgs.

* cited by examiner

SYSTEMS AND METHODS FOR PROVIDING VIRTUAL REALITY CONTENT IN AN ONLINE GAME

FIELD OF THE DISCLOSURE

This disclosure relates to systems and methods for providing virtual reality content in an online game.

BACKGROUND

Users may interact with online games via multiple platforms. Typically, online games are played via non-virtual reality platforms. Virtual reality platforms may provide a more immersive nature of gameplay. Matching users of virtual reality platforms with users of non-virtual reality platforms may be difficult because users playing via virtual reality platforms may have greater interactive potential than users playing via non-virtual reality platforms. Systems and methods for increasing participation among users of virtual reality platforms may allow for greater interactions between users of virtual reality platforms.

SUMMARY

One aspect of the disclosure relates to systems and methods for providing virtual reality content in an online game. A game instance of the online game may be executed. The game instance may include the virtual reality content. Users of the online game may interact with the online game and/or each other via the users' client computing platforms. The client computing platforms may include virtual reality platforms and non-virtual reality platforms. In one aspect of the disclosure, virtual reality content in an online game may be provided by determining whether the users of the online game are attempting to join the game instance via the virtual reality platforms or the non-virtual reality platforms. Access to the game instance may be provided to users attempting to join the game instance via one or more of the virtual reality platforms. Access to the game instance may be denied to users attempting to join the game instance via one or more of the non-virtual reality platforms.

In one aspect of the disclosure, virtual reality content in an online game may be provided by determining a set of objectives to be achieved by the users. The set of objectives may include a first objective requiring one or more interactions of the users with the virtual reality content, a second objective not requiring the one or more interactions of the users with the virtual reality content, and/or other objectives. Users playing the online game via one or more of the virtual reality platforms during a time period may be required to achieve the first objective. Users playing the online game via one or more of the non-virtual reality platforms during the time period may be required to achieve the second objective.

In one aspect of the disclosure, virtual reality content in an online game may be provided by determining, for users interacting with the online game during a time period, one or more objectives to be achieved by the users to advance in the online game. The one or more objectives may require one or more interactions of the users with the virtual reality content. The users may be required to achieve the one or more objectives in the online game via operation of the virtual reality platforms.

Providing virtual reality content in an online game may be performed by one or more physical processors executing computer program components. In some implementations, the system may include one or more servers. The server(s) may be configured to communicate with one or more client computing platforms according to a client/server architecture. The users may access the system via client computing platform(s), for instance to engage in one or more games.

The physical processor(s) may be configured to execute one or more computer program components to provide virtual reality content in an online game. It is noted that the client computing platforms may include one or more computer program components that are the same as or similar to the computer program components of the physical processor(s) to facilitate in game actions.

In one aspect of the disclosure, the computer program components may include one or more of a game instance component, a platform component, an access component, and/or other components.

The game instance component may execute a game instance of the online game. The game instance may include the virtual reality content. In some implementations, the game instance of the online game may be executed during a time period. In some implementations, the time period may include a duration within 5 PM to 11 PM for a time zone in which the most number of users are located. In some implementations, the game instance of the online game may include a set of rewards for users interacting with the online game via the one or more of the virtual reality platforms. In some implementations, the game instance component may execute another instance of the online game. The other game instance may not include the virtual reality content.

The game instance component may use the game instance to generate game state information. The game state information may be transmitted to client computing platforms over a network. The game state information may facilitate presentation of views of the online game to users via the client computing platforms. The execution of the game instance may enable interaction by the users with the online game and/or each other by performing operations in the game instance in response to commands received over the network from the client computing platforms. The client computing platforms may include virtual reality platforms, non-virtual reality platforms, and/or other platforms.

In some implementations, the virtual reality platforms may include one or more of a virtual reality headset display, a motion controller, a haptic generator, and/or other virtual reality platforms. In some implementations, the virtual reality platforms may include one or more of non-virtual reality platforms. For example, a virtual reality platform may include a virtual reality headset display and a laptop device. As another example, a virtual reality platform may include a mobile device configured to act as a head-mounted display device. Other combinations and configurations of non-virtual reality platforms to function as virtual reality platforms are contemplated.

The platform component may determine whether the users of the online game are attempting to join the game instance via the virtual reality platforms or the non-virtual reality platforms. The platform component may obtain client computing platform information. The client computing platform information may include information that identifies virtual reality capability of the client computing platform (e.g., virtual reality vs. non-virtual reality, etc.), a class of the client computing platform, a particular type of the client computing platform, and/or other information identifying the client computing platform. The client computing platform information may be obtained passively or actively.

The access component may, responsive to determination that an individual user is attempting to join the game instance via one or more of the virtual reality platforms, provide access to the game instance to such individual user. The access component may, responsive to determination that an individual user is attempting to join the game instance via one or more of the non-virtual reality platforms, deny access to the game instance to such individual user. In some implementations, the access component may, responsive to the determination that the individual user is attempting to join the game instance via the one or more of the non-virtual reality platforms, provide access to the other game instance to such individual user.

In some implementations, the access component may provide one or more rewards from a set of rewards to the users interacting with the online game via the one or more of the virtual reality platforms. In some implementations, the access component may provide the one or more rewards to the users interacting with the online game via the one or more of the virtual reality platforms in response to the users joining the game instance via the one or more of the virtual reality platforms during a time period. In some implementations, the access component may provide one or more rewards to the users interacting with the online game via the one or more of the virtual reality platforms in response to the users interacting with the game instance via the one or more of the virtual reality platforms for a certain duration within a time period.

In one aspect of the disclosure, the computer program components may include one or more of a game instance component, an objectives component, a platform component, a VR objectives component, a non-VR objectives component, and/or other components.

The game instance component may execute a game instance of the online game. The game instance may include the virtual reality content.

The game instance component may use the game instance to generate game state information. The game state information may be transmitted to client computing platforms over a network. The game state information may facilitate presentation of views of the online game to users via the client computing platforms. The execution of the game instance may enable interaction by the users with the online game and/or each other by performing operations in the game instance in response to commands received over the network from the client computing platforms. The client computing platforms may include virtual reality platforms, non-virtual reality platforms, and/or other platforms.

The objectives component may determine a set of objectives to be achieved by the users. The set of objectives may include a first objective, a second objective, and/or other objectives. The first objective may require one or more interactions of the users with the virtual reality content. The second objective may not require the one or more interactions of the users with the virtual reality content.

In some implementations, the first objective may be characterized by a first game difficulty and the second objective may be characterized by a second game difficulty. The first game difficulty may be lower than the second game difficulty. In some implementations, the first objective may be characterized by a first type of gameplay and the second objective may be characterized by a second type of gameplay. The first type of gameplay may differ from the second type of gameplay. In some implementations, the first objective may be associated with a first reward and the second objective may be associated with a second reward. The first reward may differ from the second reward.

The platform component may determine whether the users of the online game are playing the online game via the virtual reality platforms or the non-virtual reality platforms during a time period. The platform component may obtain client computing platform information. The client computing platform information may include information that identifies virtual reality capability of the client computing platform (e.g., virtual reality vs. non-virtual reality, etc.), a class of the client computing platform, a particular type of the client computing platform, and/or other information identifying the client computing platform. The client computing platform information may be obtained passively or actively. In some implementations, the platform component may determine changes in the client computing platforms used by the users to interact with the online game during the time period.

The VR objectives component may, responsive to determination that an individual user is playing the online game via one or more of the virtual reality platforms during the time period, require such individual user to achieve the first objective in the online game via the one or more of the virtual reality platforms. In some implementations, the VR objectives component may, responsive to determination that an individual user changed from playing the online game via the one or more of the non-virtual reality platforms to the one or more of the virtual reality platforms during the time period, cancel the second objective for such individual user and require such individual user to achieve the first objective in the online game via the one or more of the virtual reality platforms. In some implementations, the VR objectives component may, responsive to determination that an individual user achieved the first objective, provide the first reward to such individual user.

The non-VR objectives component may, responsive to determination that an individual user is playing the online game via one or more of the non-virtual reality platforms during the time period, require such individual user to achieve the second objective in the online game via the one or more of the non-virtual reality platforms. In some implementations, the non-VR objectives component may, responsive to determination that an individual user changed from playing the online game via the one or more of the virtual reality platforms to the one or more of the non-virtual reality platforms during the time period, cancel the first objective for such individual user and require such individual user to achieve the second objective in the online game via the one or more of the non-virtual reality platforms. In some implementations, the non-VR objectives component may, responsive to determination that an individual user achieved the second objective, provide the second reward to such individual user.

In one aspect of the disclosure, the computer program components may include one or more of a game instance component, an objectives component, a progress component, and/or other components.

The game instance component execute a game instance of the online game during a time period. The game instance may include the virtual reality content. In some implementations, the game instance component may execute another instance of the online game. The other game instance may not include the virtual reality content.

The game instance component may use the game instance to generate game state information. The game state information may be transmitted to client computing platforms over a network. The game state information may facilitate presentation of views of the online game to users via the client computing platforms. The execution of the game instance may enable interaction by the users with the online game and/or each other by performing operations in the game instance in response to commands received over the network from the client computing platforms. The client computing platforms may include virtual reality platforms, non-virtual reality platforms, and/or other platforms.

The objectives component may, for users interacting with the online game during the time period, determine one or more objectives to be achieved by the users to advance in the online game. The one or more objectives may require one or more interactions of the users with the virtual reality content.

The progress component may require the users to achieve the one or more objectives in the online game via operation of the virtual reality platforms. In some implementations, the progress component may determine whether the users of the online game are playing the online game via the virtual reality platforms or the non-virtual reality platforms during the time period. The progress component may obtain client computing platform information. The client computing platform information may include information that identifies virtual reality capability of the client computing platform (e.g., virtual reality vs. non-virtual reality, etc.), a class of the client computing platform, a particular type of the client computing platform, and/or other information identifying the client computing platform. The client computing platform information may be obtained passively or actively.

In some implementations, the progress component may, responsive to determination that an individual user is playing the online game via one or more of the non-virtual reality platforms during the time period, effectuate presentation of an invitation to such user to change to one or more of the virtual reality platforms. In some implementations, the progress component may, responsive to determination that an individual user is playing the online game via one or more of the non-virtual reality platforms during the time period, provide access to the other game instance to such individual user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1A:
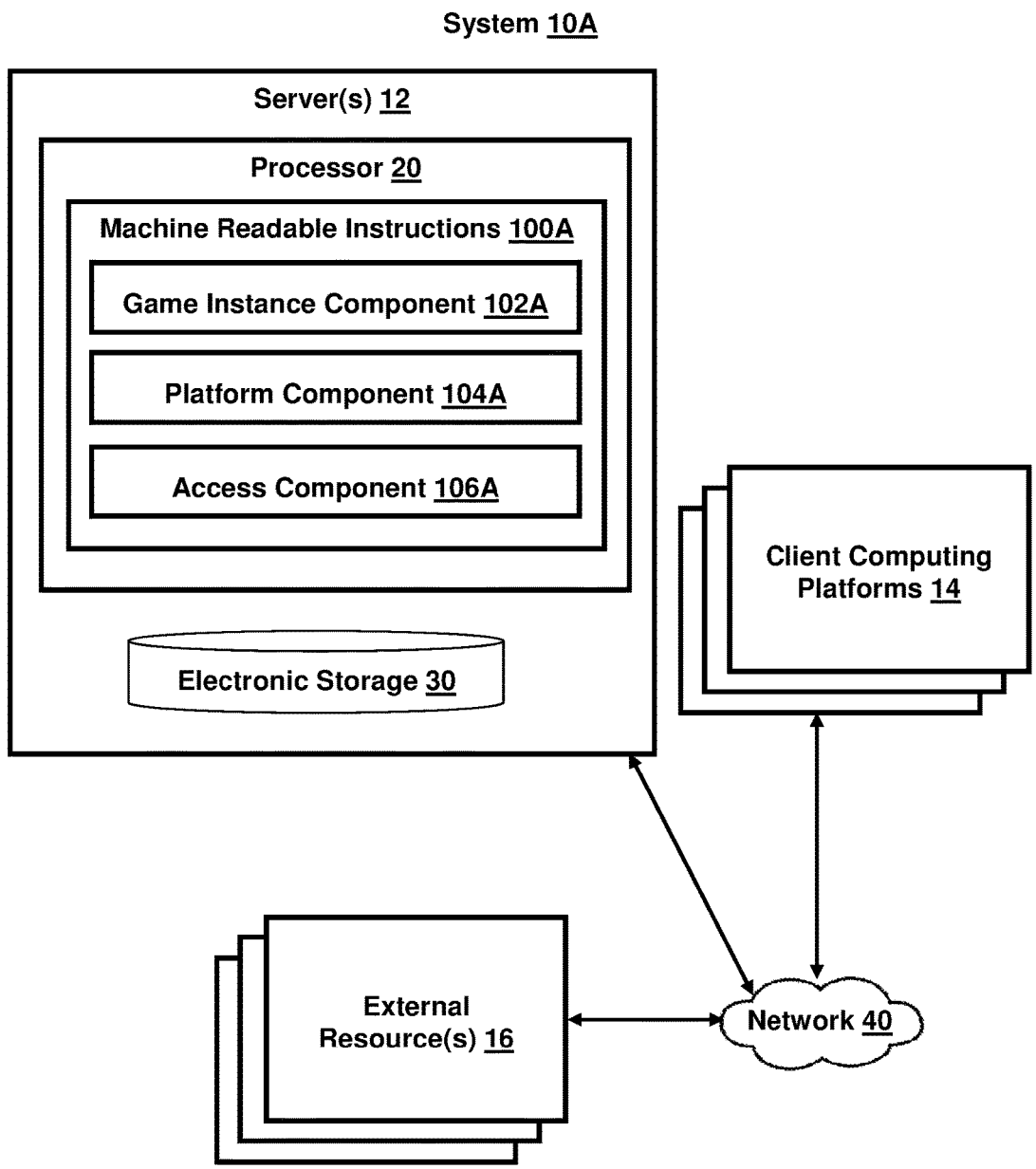
FIGS. 1A-1C illustrate systems for providing virtual reality content in an online game.
Figure 1B:
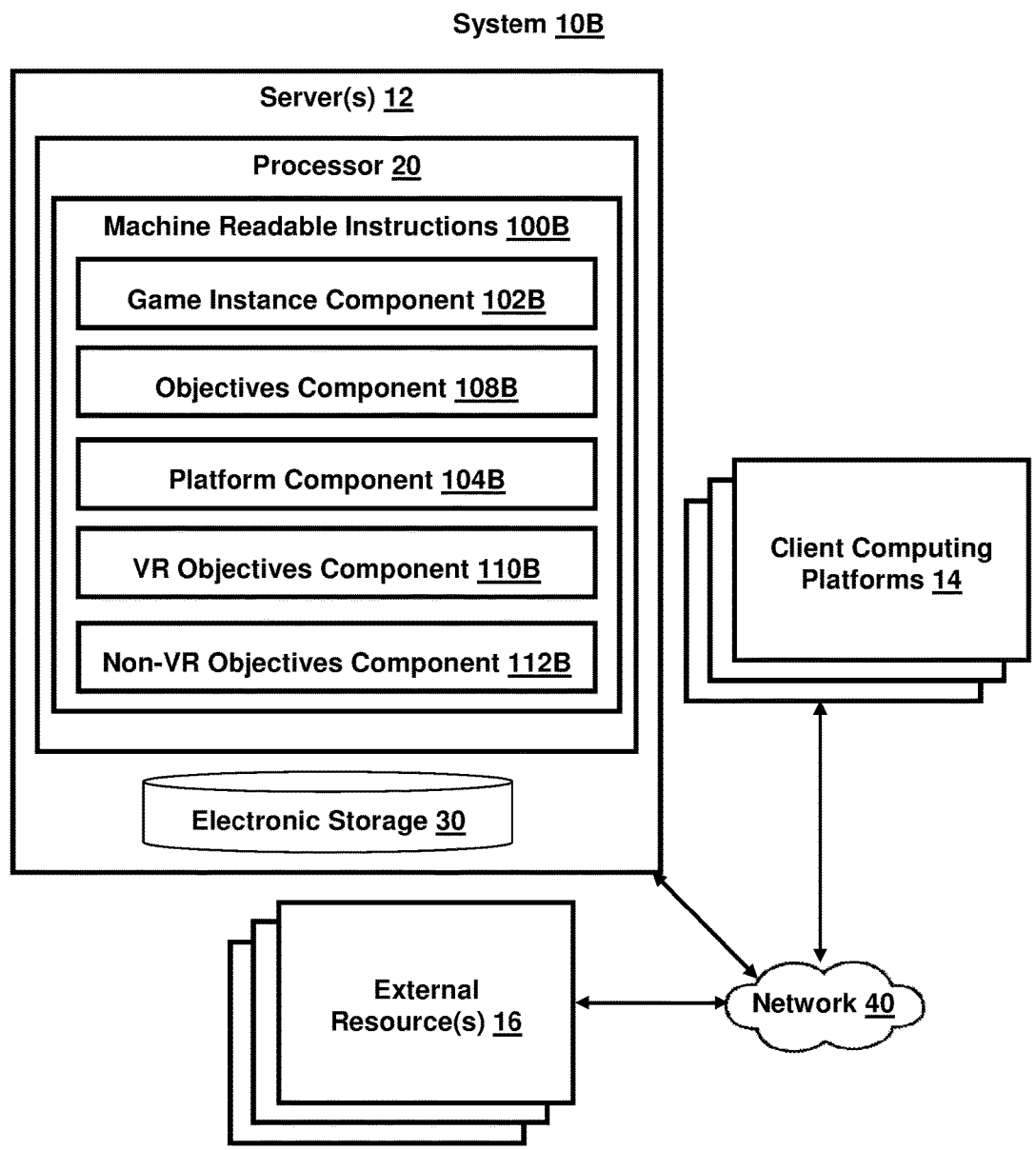
Figure 1C:
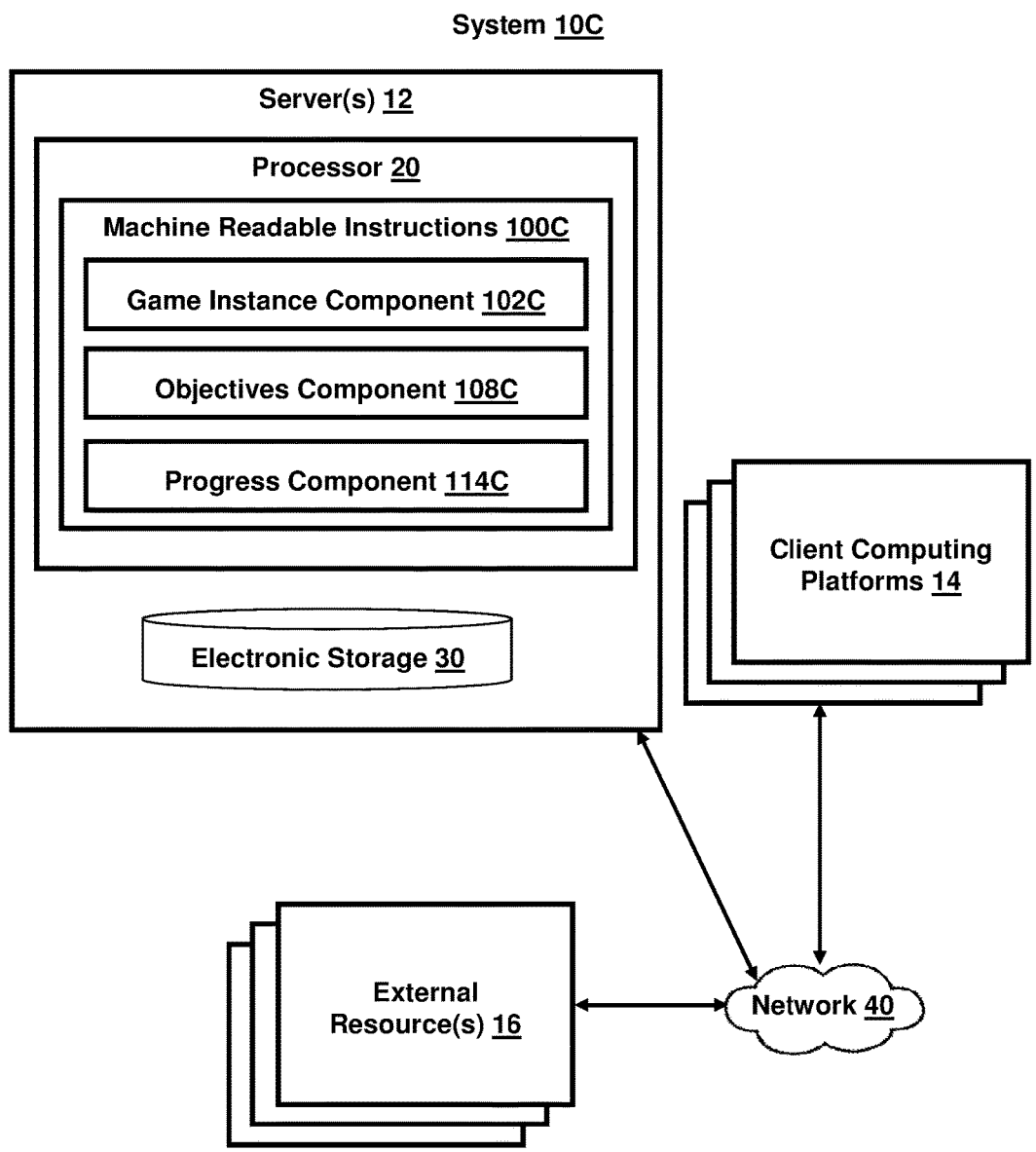

FIGS. 1A-1C illustrates systems 10A-10C configured to provide virtual reality content in an online game. Providing one or more of the online games may include hosting the online games over a network. In some implementations, as shown in these examples, systems 10A-10C may include one or more servers 12 configured for hosting online games.

Figure 3:
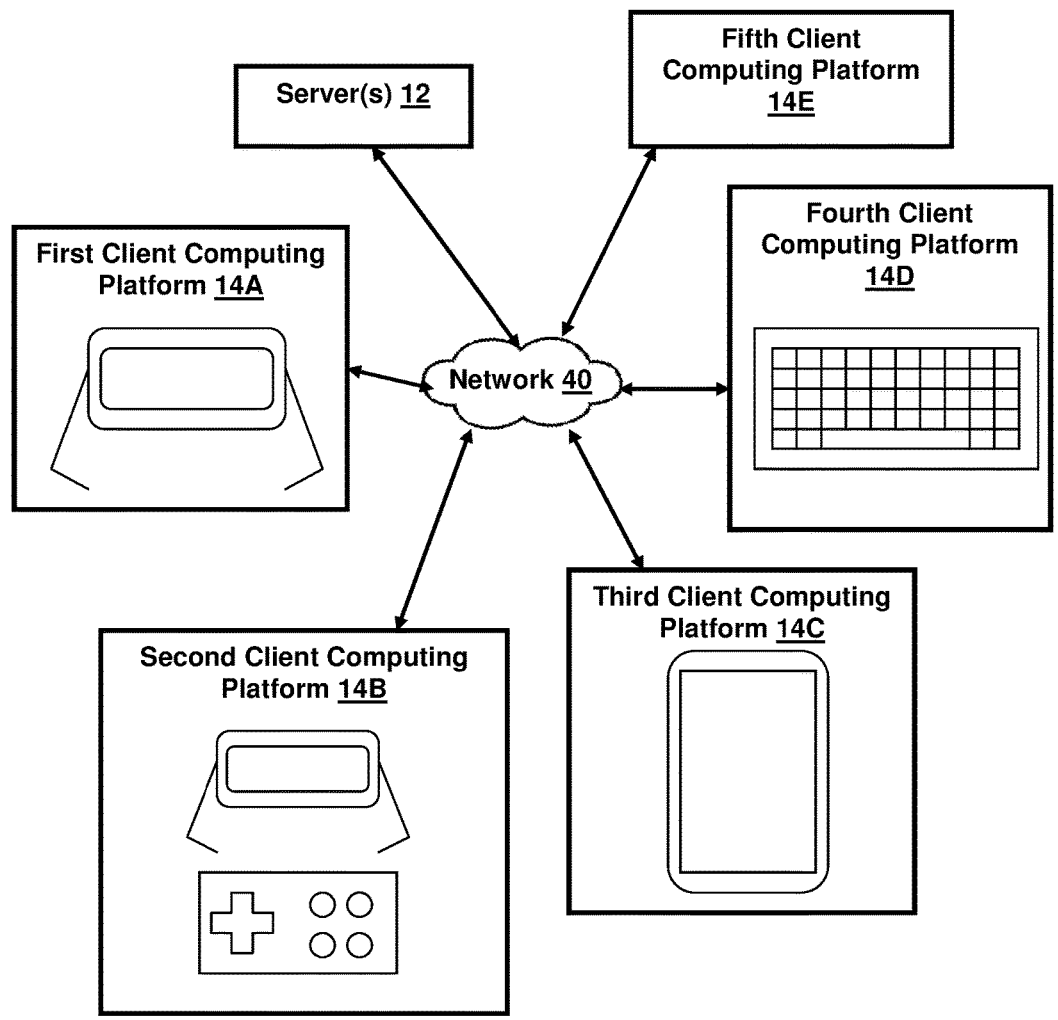
FIG. 3 illustrates an exemplary connection between server(s) and client computing platforms.

Users may access systems 10A-10C, the online game, and/or a game instance of the online game via client computing platforms 14, such as client computing platforms 14A-E as shown in FIG. 3. Systems 10A-10C may include one or more of server(s) 12, client computing platforms 14, external resource(s) 16, processor 20, electronic storage 30, network 40, and/or other components. Server(s) 12, client computing platforms 14, external resource(s) 16, and/or other components may be connected via network 40.

Client computing platforms 14 may include virtual reality platforms and/or non-virtual reality platforms. Virtual reality platforms may refer to platforms that allow users of a game to interact with a virtual space as the users would interact with the real world. The virtual reality platforms may provide one or more sensory experience that simulates the users' presence in the virtual space. Sensory experience provided by virtual reality platforms may include one or more of experience based on sight, touch, hearing, smell and/or other sensory experience. As non-limiting examples, the virtual reality platforms may include one or more of a virtual reality headset display, a motion controller, a haptic generator, and/or other virtual reality platforms.

In some implementations, the virtual reality platforms may include one or more of non-virtual reality platforms. For example, a virtual reality platform may include a virtual reality headset display and a laptop device. As another example, a virtual reality platform may include a mobile device configured to act as a head-mounted display device. Other combinations and configurations of non-virtual reality platforms to function as virtual reality platforms are contemplated.

Virtual reality platforms may present views of the online game in a manner that simulates the users' immersion within the online game. The online game may have a higher interactive potential when played via the virtual reality platforms than when played via the non-virtual reality platforms. For example, the virtual reality platforms may be able to support additional and/or increased motion inputs, views, visibility, feedback and/or other interactions a user may have with the online game.

External resources 16 may include sources of information, hosts and/or providers of virtual environments outside of systems 10A-10C, external entities participating with systems 10A-10C, and/or other resources.

Server(s) 12 may include electronic storage 30. Electronic storage 30 may include electronic storage media that electronically stores information. Electronic storage 30 may store software algorithms, information determined by processor 20, information received remotely, information received from server(s) 12, information received from client computing platforms 14, and/or other information that enables systems 10A-10C and/or server(s) 12 to function properly. For example, electronic storage 30 may store information relating to an online game, information relating to a game instance of an online game, information relating to virtual reality platforms and non-virtual reality platforms, information relating to objectives, information relating to rewards, information relating to one or more computer components, and/or other information.

Server(s) 12 may be configured to communicate with one or more client computing platforms 14 according to a client/server architecture, and with each other. Server(s) 12 may include processor 20 configured to execute one or more machine readable instructions 100. In some implementations, client computing platforms 14 may include one or more computer program components that are the same as or similar to the computer program components of physical processor 20 to facilitate in game actions.

Game instance components 102A-C of systems 10A-C may execute a game instance of the online game. The game instance may include the virtual reality content. Virtual reality content may refer to content in the online game that requires interaction via virtual reality platforms. Virtual reality content may require input from virtual reality platforms and/or output to virtual reality platforms. For example, virtual reality content may require one or more movements and/or gestures of a user (e.g., hand motion, head motion, body motion, etc.) registered by the virtual reality platforms to interact with the virtual reality content. As another example, virtual reality content may provide output from the online game via the virtual reality platforms (e.g., displaying views of the game instance, generating vibrations, etc.).

The game instance of the online game may comprise a simulated virtual space, e.g., a virtual space that is accessible by users via clients (e.g., client computing platforms 14) that present the views of the virtual space to a user. The virtual space may have a topography, express ongoing real-time interaction by one or more users and/or include one or more objects positioned within the topography that are capable of locomotion within the topography. In some instances, the topography may include a two-dimensional topography. In other instances, the topography may include a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

It should be understood the above description of the manner in which state of the virtual space associated with the online game as determined by game instance component 102A-C is not intended to be limiting. Game instance component 102A-C may be configured to express the virtual space in a more limited, or richer, manner. For example, views determined for the online game representing the game state of the instance of the online game may be selected from a limited set of graphics depicting an occurrence in a given place within the online game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the online game are contemplated.

Game instance component 102A-C may be configured to use the game instance to generate game state information that is transmitted to client computing platforms 14 over network 40. The execution of the instance of the online game by game instance component 102A-C may include determining a game state associated with the online game. The game state information may facilitate presentation of views of the online game to the users via client computing platforms 14. The game state information may include information defining the virtual space in which the online game is played.

Game instance component 102A-C may be configured to transmit the game state information over network 40 to the client computing platforms 14, causing client computing platforms 14 to present views of the online game. The game state information may be communicated (e.g., via streaming visual data, via object/position data, and/or other state information) from server(s) 12 to client computing platforms 14 for presentation to users.

The game state information determined and transmitted to a given client computing platform 14 may correspond to a view for a user character being controlled by a user via the given client computing platform 104. The state determined and transmitted to a given client computing platform 104 may correspond to a location in a virtual space associated with the online game. The view described by the game state information for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

Views of the online game presented via a virtual reality platform may include views presented on a virtual reality headset display (e.g., a head-mounted display device, etc.). The views may be presented stereoscopically—one for each eye—via the virtual reality headset display and the user's brain may combine them to create a three-dimensional experience. The virtual reality headset display may include a head tracking system that tracks movement (e.g., position, orientation, change in position, change in orientation, etc.) of the users as they move their heads and/or move around the environment. The virtual reality headset display may include a sensor system (e.g., image sensor system, distance sensor system, etc.) that track movement of the users' body parts (e.g., user's hands, arms, feet, legs, etc.) and/or objects (e.g., glove, wand, controller, markers, etc.). Views of the online game presented via a non-virtual reality platform may include views presented on a display for one or more of a mobile device (e.g., a smart phone, tablet, laptop, etc.), desktop computer, gaming console, televisions, and/or other non-virtual reality platforms.

The execution of the game instance may enable interaction by the users with the online game and/or each other. Game instance component 102A-C may be configured to perform operations in the game instance in response to commands received over network 40 from client computing platforms 14. Within the instance of the online game, users may interact with elements in the online game and/or with each other through gameplays provided by the online game.

Users may participate in the online game through client game applications implemented on client computing platforms 14 associated with the users. Within the game instance of the online game executed by game instance component 102A-C, the users may participate by controlling one or more of an element in the virtual space associated with the online game. The user-controlled elements may include avatars, user characters, virtual space units (e.g., troops), objects (e.g., weapons, horses, vehicle and so on), simulated physical phenomena (e.g., wind, rain, earthquakes, and/or other phenomena), and/or other user-controlled elements.

The user-controlled avatars may represent the users in the virtual space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other game entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing portion, and/or any other virtual items that may be employed by the users for interaction within the online game.

The user controlled element(s) may move through and interact with the virtual space (e.g., user-virtual space units in the virtual space, non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

Controls of virtual elements in the online game may be exercised through commands input by a given user through client computing platforms 14. The given user may interact with other users through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server(s) 12 (e.g., through game instance component 102A-C).

Execution and/or performance of the user action by game instance component 102A-C may produce changes to the game state, which may reflect progresses and/or results of the user actions. In some examples, state changes caused by the execution of the user actions may be recorded in the electronic storage 30 to facilitate persistency throughout the instance of the online game. In some examples, execution of the user actions may not produce persistent changes to the game state (e.g., a user character jumping forward and backward successively may not produce any perceivable game state changes to other users).

A given user may input commands with specific parameters to undertake specific deeds, actions, functions, spheres of actions and/or any other types of interactions within the virtual space. For example, the given user may input commands to construct, upgrade and/or demolish virtual buildings; harvest and/or gather virtual resources; heal virtual user-controlled elements, non-player entities and/or elements controlled by other users; train, march, transport, reinforce, reassign, recruit, and/or arrange troops; attack, manage, create, demolish and/or defend cities, realms, kingdoms, and/or any other virtual space locations controlled by or associated with the users; craft or transport virtual items; interact with, compete against or along with non-player entities and/or virtual space elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual space. In some examples, the given user may input commands to compete against elements in an environment within the virtual space—i.e., Player vs. Environment (PvE) activities. In some examples, the given user may input commands to compete against each other within the virtual space—i.e., Player vs. Player (PvP) activities.

In some implementations, when the online game is played via a virtual reality platform, a given user may input a broad range of commands. The input commands via virtual reality platform may include the user performing the action as an input command. Based on the user's actions in the real world, the user may be able to look around, move about, and/or otherwise act within the virtual space in which the online game is played.

The instance of the online game may comprise virtual entities automatically controlled in the instance of the online game. Such virtual entities may or may not be associated with any user. As such, the automatically controlled virtual entities may be generated and/or developed by artificial intelligence configured with server(s) 12 by a provider, administrator, moderator, and/or any other entities related to the online game. These automatically controlled entities may evolve within the online game free from user controls and may interact with the entities controlled by or associated with the users, other automatically controlled virtual space entities, as well as the topography of the virtual space. Certain manifested traits may be associated with the automatically controlled entities in accordance with the artificial intelligence configured with server(s) 12. As used herein, such automatically controlled virtual space entities in the instance of the online game are referred to as "non-player entities."

The instance of the online game may be persistent. That is, the online game may continue on whether or not individual users are currently logged in and/or participating in the online game. A user that logs out of the online game and then logs back in some time later may find the virtual space and/or the online game has been changed through the interactions of other users with the online game during the time the user was logged out. These changes may include changes to the simulated physical space, changes in the user's inventory, changes in other users' inventories, changes experienced by non-user characters, and/or other changes.

In one aspect of the disclosure, virtual reality content in an online game may be provided by determining whether the users of the online game are attempting to join the game instance via the virtual reality platforms or the non-virtual reality platforms. Access to the game instance may be provided to users attempting to join the game instance via one or more of the virtual reality platforms. Access to the game instance may be denied to users attempting to join the game instance via one or more of the non-virtual reality platforms.

Referring to FIG. 1A, machine readable instructions 100A may include one or more computer program components. The computer program components may include one or more of game instance component 102A, platform component 104A, access component 106A, and/or other components.

Game instance component 102A may be configured to execute a game instance of the online game. The game instance may include virtual reality content, as describe above. In some implementations, the game instance of the online game may be executed during a time period. A time period may refer to one or more durations of time in which the game instance is executed and is available for play by the users.

In some implementations, the time period may include a duration within 5 PM to 11 PM for a time zone in which the most number of users are located. For example, a time period may include a duration from 6 PM to 9 PM. As another example, a time period may include durations from 5 PM to 8 PM and from 9:30 PM to 10:30 PM. Durations of time may change between day(s), week(s), month(s), year(s), and/or other times. For example, a time period may include a duration from 7:30 PM to 9:30 PM on weekdays and durations from 9 AM to 11 AM and 4:30 PM to 11:30 PM on weekends. Others durations of time are contemplated.

The time zone for the time period may be selected based on the numbers of users. For example, a time zone may be selected based on the time zone having more number of users registered to play the online game than other time zones. The users may be registered to play the online game via virtual reality platforms and/or non-virtual reality platforms. As another example, a time zone may be selected based on historical information regarding users playing the online game via virtual reality platforms and/or non-virtual reality platforms. A time zone historically having the most number of playing users may be selected for the time period. The historical information regarding users playing the online game may be gathered for different time periods, such as for a part of a day/week/month, a full day/week/month, multiple days/week/month, etc. Other implementations of selecting the time zone are contemplated.

In some implementations, the game instance of the online game may include a set of rewards for users interacting with the online game via the one or more of the virtual reality platforms. A reward may refer to one or more changes in the online game for the users. A reward may change the interactions of the user with the online game at a time, over a period of time, at a location, or over a range of locations. For example, a reward may include one or more of changes in awards received by the users during the online game, changes in attributes of user characters, changes in virtual space units, changes in objects, and/or other changes in the online game.

Awards received by the users during the online game may be changed by increasing the award (e.g., receiving twice as many awards, etc.), changing the type of award (e.g., receiving an object instead of virtual currency, etc.), changing the requirements for receiving the award (e.g., making it easier for the user to receive the award, etc.), and/or making other changes. Attributes of user characters may be changed by increasing one or more attributes (e.g., increasing strength of user characters, etc.), deceasing one or more attributes (e.g., decreasing wait times to perform actions, etc.), adding attributes (e.g., giving abilities not previously available, etc.), and/or making other changes. Objects may be changed by increasing one or more properties of objects (e.g., increase the strength of a sword, etc.), decreasing one or more properties of objects (e.g., decreasing adverse effects of using objects, etc.), changing properties of objects (e.g., changing an object into another object, etc.), and/or making other changes.

In some implementations, game instance component 102A may execute another instance of the online game. The other game instance may not include the virtual reality content. In some implementations, the other game instance may include a substitute non-virtual reality content for the virtual reality content (e.g., in the place of interacting with virtual reality content, the users may interact with substitute non-virtual reality content, etc.). In some implementations, the other game instance may not include a substitute non-virtual reality content for the virtual reality content (e.g., the users may miss out on virtual reality content without a chance to play substitute non-virtual reality content, etc.).

Platform component 104A may be configured determine whether the users of the online game are attempting to join the game instance via the virtual reality platforms or the non-virtual reality platforms. Platform component 104A may obtain client computing platform information and identify client computing platforms 14 used to interact with the virtual space based on the client computing platform information. The client computing platform information may include information that identifies virtual reality capability of client computing platform 14 (e.g., virtual reality vs. non-virtual reality, etc.), a class of client computing platform 14, a particular type of client computing platform 14, and/or other information identifying the client computing platform 14.

Platform component 104A may include or retrieve information (for example, a database, etc.) that matches the client computing platform information to one or more virtual reality platforms or one or more non-virtual reality platforms. For example, a class of client computing platform may include general descriptions of client computing platforms such as information indicating that a client computing platform includes a virtual reality headset display, a motion controller, a game controller, a haptic generator, a speaker, a head-mounted display device, a desktop computing device, a laptop computing device, a tablet device, a mobile device (e.g., smart phone), and/or other general description regarding the client computing platforms used to interact with the virtual space. Platform component 104A may include or retrieve information that matches one or more information regarding the class of client computing platform to one or more virtual reality platforms or one or more non-virtual reality platforms.

As another example, a type of client computing platform may include specific descriptions of client computing platforms such as a particular brand, model, operating system, and/or other description that more specifically identifies the client computing platform 14 used to interact with the virtual space. Platform component 104A may include or retrieve information that matches one or more information regarding the type of client computing platform to one or more virtual reality platforms or one or more non-virtual reality platforms.

For example, FIG. 3 illustrates exemplary connections between server(s) 12 and client computing platforms 14. Server(s) 12 may execute a game instance of an online game and users may be attempting to join the game instance via computing platforms 14. Computing platforms 14 may include first client computing platform 14A (e.g., a virtual reality headset display, etc.), second client computing platform 14B (e.g., a head-mounted display and a game controller, etc.), third client computing platform 14C (e.g., a tablet device, etc.), fourth client computing platform 14D (e.g., a laptop computing device, etc.), fifth client computing platform 14E (e.g., other client computing platform(s)), and/or other client computing platforms.

Based on the client computing platform information, platform component 104A may determine that users of first client computing platform 14A and second client computing platform 14B are attempting to join the game instance via virtual reality platforms. Based on the client computing platform information, platform component 104A may determine that users of third client computing platform 14C and fourth client computing platform 14D are attempting to join the game instance via non-virtual reality platforms. Based on the client computing platform information, platform component 104A may determine whether the user of fifth client computing platform 14E is attempting to join the game instance via virtual reality platform or non-virtual reality platform.

Platform component 104A may obtain the client computing platform information passively or actively. Platform component 104A may passively obtain the client computing platform information based on communications with client computing platforms 14 such as by reading headers and/or other portions of communications from client computing platforms 14 to identify the client computing platforms being used to interact with the virtual space. For example, platform component 104A may read Hypertext Transfer Protocol ("HTTP") headers to determine a browser used to interact with the virtual space and accordingly identify the client computing platform that operates the browser. Agents used to interact with the virtual space other than a browser may be operating on client computing platform 14. Such agents may encode the client computing platform information and provide to server(s) 12 the client computing platform information.

Platform component 104A may actively obtain the client computing platform information such as by querying and/or otherwise causing client computing platforms 14 to provide the client computing platform information. For example, platform component 104A and/or an agent operating on client computing platforms 14 may cause a prompt for users to input the client computing platform information.

Access component 106A may be configured to, responsive to determination that an individual user is attempting to join the game instance via one or more of the virtual reality platforms, provide access to the game instance to such individual user. Access to the game instance may be provided by allowing the users to join the game instance and begin playing the online game.

Access component 106A may be configured to, responsive to determination that an individual user is attempting to join the game instance via one or more of the non-virtual reality platforms, deny access to the game instance to such individual user. Access to the game instance may be denied by preventing the users from joining the game. In some implementations, denying access to the game instance may include providing information about one or more of the virtual reality platforms required to join the game instance.

In some implementations, access component 106A may be configured to, responsive to the determination that the individual user is attempting to join the game instance via the one or more of the non-virtual reality platforms, provide access to the other game instance to such individual user. The other game instance may not include the virtual reality content. In some implementation, providing access to the other game instance may include providing information about the other game instance. In some implementation, providing access to the other game instance may include providing information about one or more of the virtual reality platforms required to join the game instance.

In some implementations, access component 106A may be configured to provide one or more rewards from a set of rewards to the users interacting with the online game via the one or more of the virtual reality platforms. A reward may change the interaction of the users with the online game. For example, a reward may include one or more of changes in awards received by the users during the online game, changes in attributes of user characters, changes in virtual space units, changes in objects, and/or other changes in the online game, as described above.

In some implementations, access component 106A may provide the one or more rewards to the users interacting with the online game via the one or more of the virtual reality platforms in response to the users joining the game instance via the one or more of the virtual reality platforms during a time period. For example, a time period may include a duration from 9 PM to 11 PM in a certain time zone and access component 106 may provide one or more rewards to users that join the online game at any time between 9 PM and 11 PM via one or more of the virtual reality platforms. Information regarding one or more rewards provided to users may be stored so that a user joining the online game multiples times during the time period do not receive multiple rewards.

In some implementations, access component 106A may provide one or more rewards to the users interacting with the online game via the one or more of the virtual reality platforms in response to the users interacting with the game instance via the one or more of the virtual reality platforms for a certain duration within a time period. For example, a time period may include a duration from 9 AM and 11 AM and a certain duration may include thirty minutes. Access component 106A may provide one or more rewards to users that join the online game between 9 AM and 11 AM and interact with the game for thirty minutes. In some implementations, users may be required to interact with the online game for the certain duration consecutively (e.g., a user that joins the online game at 9 AM and 10 AM and interacts with the game for 15 minutes each time may not receive a reward, etc.). In some implementations, users may be required to interact with the online game for the certain duration within the time period (e.g., a user that joins the online game at 10:50 AM and interacts with the game until 11:20 AM may not receive a reward, etc.). Information regarding one or more rewards provided to users may be stored so that a user joining the online game multiples times during the time period and interacting with the online game for the certain duration do not receive multiple rewards.

In one aspect of the disclosure, virtual reality content in an online game may be provided by determining a set of objectives to be achieved by the users. The set of objectives may include a first objective requiring one or more interactions of the users with the virtual reality content, a second objective not requiring the one or more interactions of the users with the virtual reality content, and/or other objectives. Users playing the online game via one or more of the virtual reality platforms during a time period may be required to achieve the first objective. Users playing the online game via one or more of the non-virtual reality platforms during the time period may be required to achieve the second objective.

Referring to FIG. 1B, machine readable instructions 100B may include one or more computer program components. The computer program components may include one or more of game instance component 102B, objectives component 108B, platform component 104B, VR objectives component 110B, non-VR objectives component 112B, and/or other components.

Game instance component 102B may be configured to execute a game instance of the online game. The game instance may include virtual reality content, as described above.

Objectives component 108B may be configured to determine a set of objectives to be achieved by the users. An objective may refer to a set of interactions required between the online game and the users. The interactions between the online game and the users may require interactions of the users with one or more elements in the online game and/or with each other through gameplays provided by the online game. As non-limiting examples, an objective may include requiring users interactions with the online game to reach a certain point in the online game, obtain a certain level for the user character, obtain a certain object, interact with a certain user, win a battle against a certain user or an enemy, and/or other interactions with the online game.

A set of objectives may include a first objective, a second objective, and/or other objectives. The first objective may require one or more interactions of the users with the virtual reality content. For example, the first objective may require the users to manipulate a virtual puzzle by hand via one or more virtual reality platforms. The second objective may not require the one or more interactions of the users with the virtual reality content. For example, the second object may require the users to manipulate a virtual puzzle by clicking on the surface of a tablet device. Other types of objectives are contemplated.

In some implementations, the objectives may be characterized by different game difficulties. Game difficulty may refer to one or more parameters of the online game that determines interaction results of the users with one or more elements in the online game and/or with each other. Game difficulty may be static or dynamic. Game difficulty for an online game/game instance may remain the same throughout a play of the online game or change during the play of the online game. In some implementations, the first objective may be characterized by a first game difficulty and the second objective may be characterized by a second game difficulty. The first game difficulty may be lower than the second game difficulty.

For example, a low difficulty may include changes in the online game that make it easier for the users to achieve an objective. For example, a low difficulty may include changes in attributes of user characters (e.g., increasing strength of user characters, etc.), changes in virtual space units (e.g., changing the abilities of virtual space units, etc.), changes in objects (e.g., increasing durability of weapons, etc.), changes in non-player entities (e.g., decreasing health of non-player entities, etc.) and/or other changes in the online game that make it easier for the users to achieve the objective.

As another example, a high difficulty may include changes in the online game that make it harder for the users to achieve an objective. For example, a high difficulty may include changes in attributes of user characters (e.g., decreasing health of user characters, etc.), changes in virtual space units (e.g., changing the skills of virtual space units, etc.), changes in objects (e.g., decreasing object effects, etc.), changes in non-player entities (e.g., increasing magic power of non-player entities, etc.) and/or other changes in the online game that make it harder for the users to achieve the objective.

In some implementations, the objectives may be characterized by different types of gameplay. For example, the first objective may be characterized by a first type of gameplay and the second objective may be characterized by a second type of gameplay. A gameplay may refer to a manner in which users interact with the online game. A gameplay may define one or more of views of the online game, options available to users to interact with the online game and/or each other, inputs into the online game available to users, outputs out of the online game available to users, and/or other manner in which users may interact with the online game. For example, types of gameplays may include role-playing, first-person shooter, real-time strategy, turn-based strategy, simulation, music or rhythm playing, social interaction, twitching and/or any other gameplays.

The first type of gameplay may differ from the second type of gameplay. For example, the first objective may be characterize by a first-person battle type of gameplay and the second objective may be characterized by a resource gathering type of gameplay. A battle type of gameplay may include users using virtual reality platforms to fight against enemies from a first-person view (e.g., view of the game instance may be generated from the position of the user's avatars, and the users may use physical motions to change the direction of view, to duck, to jump, to strike, to defend, etc. within the online game) A resource gathering type of gameplay may include users using non-virtual reality platforms to gather resources (e.g., view of the game instance may be generated above the position of the user's avatars (e.g., top-down view, etc.), and the users may use controllers (e.g., game controller, keyboard, mouse, touch screen, etc.) to command gathering of resources, etc.). Other types of gameplays are contemplated.

In some implementations, the types of gameplay for the objectives may be determined based on historical information regarding users' prior plays of the online game and/or other games. Historical information regarding the users' prior plays may characterize the type of gameplays preferred by the users. For example, historical information regarding the users' prior plays may track users' decisions to play certain types of gameplays over other types of gameplays (e.g., a user provided with an option of playing a battle type of gameplay or a resource gathering type of gameplay may choose the battle type of gameplay more often than the resource gathering type of gameplay, etc.). The first type of gameplay of the first objective may include one or more types of gameplay more preferred by the users. The second type of gameplay of the second objective may include one or more types of gameplay less preferred by the users.

In some implementations, the objectives may be characterized by different rewards. For example, the first objective may be associated with a first reward and the second objective may be associated with a second reward. Rewards may be provided to the users upon the users achieving the associated objectives. A reward may change the interaction of the users with the online game. For example, a reward may include one or more of changes in awards received by the users during the online game, changes in attributes of user characters, changes in virtual space units, changes in objects, and/or other changes in the online game, as described above.

The first reward may differ from the second reward. For example, the first reward may include one or more of changes in awards received by the users during the online game, changes in attributes of user characters, changes in virtual space units, changes in objects, and/or other changes in the online game that provide more benefit(s) to the users than the benefit(s) provided by the second reward. For example, the first reward may be twice as large as the second reward.

In some implementations, the rewards associated with the objectives may be determined based on historical information regarding users' prior plays of the online game and/or other games. Historical information regarding the users' prior plays may characterize the type of rewards preferred by the users. For example, historical information regarding the users' prior plays may track users' decisions to seek after certain types of rewards over other types of rewards (e.g., a user provided with an option of playing to receive a user character attributes reward or an object reward may choose the object reward more often than the user character attributes reward, etc.). The first reward associated with the first objective may include one or more types of rewards more preferred by the users. The second reward associated with the second objective may include one or more types of rewards less preferred by the users.

Platform component 104B may be configured to determine whether the users of the online game are playing the online game via the virtual reality platforms or the non-virtual reality platforms during a time period. Platform component 104B may obtain client computing platform information and identify client computing platforms 14 used to interact with the virtual space based on the client computing platform information as described above.

In some implementations, platform component 104B may be configured to determine changes in client computing platforms 14 used by the users to interact with the online game. Platform component 104B may determine when a given user changes the client computing platform 14 used to interact with the virtual space. For example, a user may change from using a laptop device to using a virtual reality headset display to interact with the virtual space. Platform component 104B may detect the change and accordingly associate the new client computing information with the user.

VR objectives component 1106 may be configured to, responsive to determination that an individual user is playing the online game via one or more of the virtual reality platforms during the time period, require such individual user to achieve the first objective in the online game via the one or more of the virtual reality platforms. VR objectives component 1106 may provide information about the first objective to the users via visual and/or audio information relating to the first objective. Visual information may refer to one or more information that may be observed visually. Visual information may be static or dynamic. For example, visual information relating to the first objective may include one or more of an image (e.g., an image showing the first objective, etc.), a text (e.g., a text describing the first objective, etc.), a video (e.g., a video showing the first objective, etc.) and/or other visual information conveying information regarding the first objective.

Audio information may refer to one or more information that may be observed audibly. Audio information may be static or dynamic. For example, audio information relating the first objective may include one or more of a sound (e.g., a sound clip associated with the first objective, etc.), a music (e.g., a song associated with the first objective, etc.), a word (e.g., a word associated with the first objective, etc.), a sentence (e.g., a sentence describing the first objective), and/or other audio information conveying information regarding the first objective.

In some implementations, VR objectives component 1106 may be configured to, responsive to determination that an individual user changed from playing the online game via the one or more of the non-virtual reality platforms to the one or more of the virtual reality platforms during the time period, cancel the second objective for such individual user and require such individual user to achieve the first objective in the online game via the one or more of the virtual reality platforms. Cancelling the second objective may prevent the users from achieving the second objective. In some implementations, VR objective component 110B may store information relating to the users' progress in achieving the second objective. If the users are later presented with the second objective, the users may continue the progress they had achieved prior to the second objective being cancelled.

In some implementations, VR objectives component 110B may be configured to, responsive to determination that an individual user achieved the first objective, provide the first reward to such individual user. VR objectives component 110B may provide the first reward to the users upon the users achieving of the first objective, upon completion of the game instance in which the user achieved the first objective, at other times during the game instance in which the user achieved the first objective, or during another game instance.

Non-VR objectives component 112B may be configured to, responsive to determination that an individual user is playing the online game via one or more of the non-virtual reality platforms during the time period, require such individual user to achieve the second objective in the online game via the one or more of the non-virtual reality platforms. Non-VR objectives component 112B may provide information about the second objective to the users via visual and/or audio information relating to the second objective.

In some implementations, non-VR objectives component 112B may be configured to, responsive to determination that an individual user changed from playing the online game via the one or more of the virtual reality platforms to the one or more of the non-virtual reality platforms during the time period, cancel the first objective for such individual user and require such individual user to achieve the second objective in the online game via the one or more of the non-virtual reality platforms. Cancelling the first objective may prevent the users from achieving the first objective. In some implementations, non-VR objective component 112B may store information relating to the users' progress in achieving the first objective. If the users are later presented with the first objective, the users may continue the progress they had achieved prior to the first objective being cancelled.

In some implementations, non-VR objectives component 112B may be configured to, responsive to determination that an individual user achieved the second objective, provide the second reward to such individual user. Non-VR objectives component 112B may provide the second reward to the users upon the users achieving of the second objective, upon completion of the game instance in which the user achieved the second objective, at other times during the game instance in which the user achieved the second objective, or during another game instance.

In one aspect of the disclosure, virtual reality content in an online game may be provided by determining, for users interacting with the online game during a time period, one or more objectives to be achieved by the users to advance in the online game. The one or more objectives may require one or more interactions of the users with the virtual reality content. The users may be required to achieve the one or more objectives in the online game via operation of the virtual reality platforms.

Referring to FIG. 1C, machine readable instructions 100C may include one or more computer program components. The computer program components may include one or more of game instance component 102C, objectives component 108C, progress component 114C, and/or other components.

Game instance component 102C may be configured to execute a game instance of the online game during a time period. The game instance may include virtual reality content, as described above.

In some implementations, game instance component 102C may be configured to execute another instance of the online game. The other game instance may not include the virtual reality content. In some implementations, the other game instance may include a substitute non-virtual reality content for the virtual reality content (e.g., in the place of interacting with virtual reality content, the users may interact with substitute non-virtual reality content, etc.). In some implementations, the other game instance may not include a substitute non-virtual reality content for the virtual reality content (e.g., the users may miss out on virtual reality content without a chance to play substitute non-virtual reality content).

Objectives component 108C may be configured to, for users interacting with the online game during the time period, determine one or more objectives to be achieved by the users to advance in the online game. The one or more objectives may require one or more interactions of the users with the virtual reality content. Users playing the online game during the period may be required to achieve the one or more objectives to advance in the online game. For example, an objective may require the users to manipulate a virtual puzzle by hand via one or more virtual reality platforms to advance in the online game. As another example, an objective may require the users to perform certain movements registerable by the virtual reality platforms to advance in the online game. Other objectives requiring interactions with the virtual reality content are contemplated.

Progress component 114C may be configured to require the users to achieve the one or more objectives in the online game via operation of the virtual reality platforms. Progress component 114C may detect interactions of the users with the online game via operation of the virtual reality platforms and determine whether the users have achieved the one or more objectives. For users that have achieved the one or more objectives, progress component 114C may allow the users to advance in the online game. For users that have not achieved the one or more objectives, progress component 114C may not allow the users to advance in the online game.

Advancing in the online game may refer to changes in the online game, such as changes in attributes of user characters (e.g., changes in character level and/or other attributes, etc.), changes in virtual space units (e.g., change in the number, types, or other characteristics of virtual space units, etc.), changes in objects (e.g., changes in the number, types, or other characteristics of objects, etc.), changes in areas within the online game available to the users (e.g., changes in elements in areas or changes in areas are available to the users, etc.), and/or other changes in the online game.

In some implementations, progress component 114C may be configured to determine whether the users of the online game are playing the online game via the virtual reality platforms or the non-virtual reality platforms during the time period. Progress component 114C may obtain client computing platform information and identify client computing platforms 14 used to interact with the virtual space based on the client computing platform information as described above with respect to platform components 104A-B.

In some implementations, progress component 114C may be configured to, responsive to determination that an individual user is playing the online game via one or more of the non-virtual reality platforms during the time period, effectuate presentation of an invitation to such user to change to one or more of the virtual reality platforms. Presentation of an invitation may be effectuated through provision of visual and/or audio information relating to the invitation.

Visual information may refer to one or more information that may be observed visually. Visual information may be static or dynamic. For example, visual information relating to the invitation may include one or more of an image (e.g., an image showing the invitation, etc.), a text (e.g., a text of the invitation, etc.), a video (e.g., a video showing the invitation, etc.) and/or other visual information conveying information regarding the invitation.

Audio information may refer to one or more information that may be observed audibly. Audio information may be static or dynamic. For example, audio information relating the invitation may include one or more of a sound (e.g., a sound clip associated with the invitation, etc.), a music (e.g., a song associated with the invitation, etc.), a word (e.g., a word associated with the invitation, etc.), a sentence (e.g., a sentence describing the invitation), and/or other audio information conveying information regarding the invitation.

In some implementations, progress component 114C may be configured to, responsive to determination that an individual user is playing the online game via one or more of the non-virtual reality platforms during the time period, provide access to the other game instance to such individual user. The other game instance may not include the virtual reality content. In some implementation, providing access to the other game instance may include providing information about the other game instance. In some implementation, providing access to the other game instance may include providing information about one or more of the virtual reality platforms required to join the game instance.

In some implementations, server(s) 12, client computing platforms 14, and/or external resources 16 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 12, client computing platforms 14, and/or external resources 16 may be operatively linked via some other communication media.

A given client computing platform 14 may include one or more processors configured to execute computer program components. The computer program components may be configured to enable a user associated with the given client computing platform 14 to interface with systems 10A-10C and/or external resources 16, and/or provide other functionality attributed herein to client computing platforms 14.

Server(s) 12 may include electronic storage 30, one or more processors 20, and/or other components. Server(s) 12 may include communication lines, or ports to enable the exchange of information with a network and/or other computing platforms. Illustration of server(s) 12 in FIGS. 1A-1C are not intended to be limiting. Server(s) 12 may include a plurality of hardware, software, and/or firmware components operating together to provide the functionality attributed herein to server(s) 12. For example, server(s) 12 may be implemented by a cloud of computing platforms operating together as server(s) 12.

Processor 20 may be configured to provide information processing capabilities in server(s) 12. As such, processor 20 may include one or more of a digital processor, a central processing unit, a graphics processing unit, a microcontroller, an analog processor, a digital circuit designed to process information, an analog circuit designed to process information, a state machine, and/or other mechanisms for electronically processing information.

Although processor 20 is shown in FIGS. 1A-1C as a single entity, this is for illustrative purposes only. In some implementations, processor 20 may include a plurality of processing units. These processing units may be physically located within the same device, or processor 20 may represent processing functionality of a plurality of devices operating in coordination. Processor 20 may be configured to execute computer components. Processor 20 may be configured to execute computer components by software; hardware; firmware; some combination of software, hardware, and/or firmware; and/or other mechanisms for configuring processing capabilities on processor 20.

It should be appreciated that although computer components are illustrated in FIGS. 1A-1C as being co-located within a single processing unit, in implementations in which processor 20 includes multiple processing units, one or more of computer components may be located remotely from the other components.

The description of the functionality provided by the different computer components described herein is for illustrative purposes, and is not intended to be limiting, as any of computer components may provide more or less functionality than is described. For example, one or more of computer components may be eliminated, and some or all of its functionality may be provided by other computer components. As another example, processor 20 may be configured to execute one or more additional computer components that may perform some or all of the functionality attributed to one or more of computer components.

Electronic storage 30 may comprise electronic storage media that electronically stores information. The electronic storage media of electronic storage 30 may include one or both of system storage that is provided integrally (i.e., substantially non-removable) with server(s) 12 and/or removable storage that is removably connectable to server(s) 12 via, for example, a port (e.g., a USB port, a firewire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 30 may include one or more virtual storage resources (e.g., cloud storage, a virtual private network, and/or other virtual storage resources). Although electronic storage 30 is shown in FIGS. 1A-1C as a single entity, this is for illustrative purposes only. In some implementations, electronic storage 30 may comprise a plurality of storage units. These storage units may be physically located within the same device, or electronic storage 30 may represent storage functionality of a plurality of devices operating in coordination.

Figure 2A:
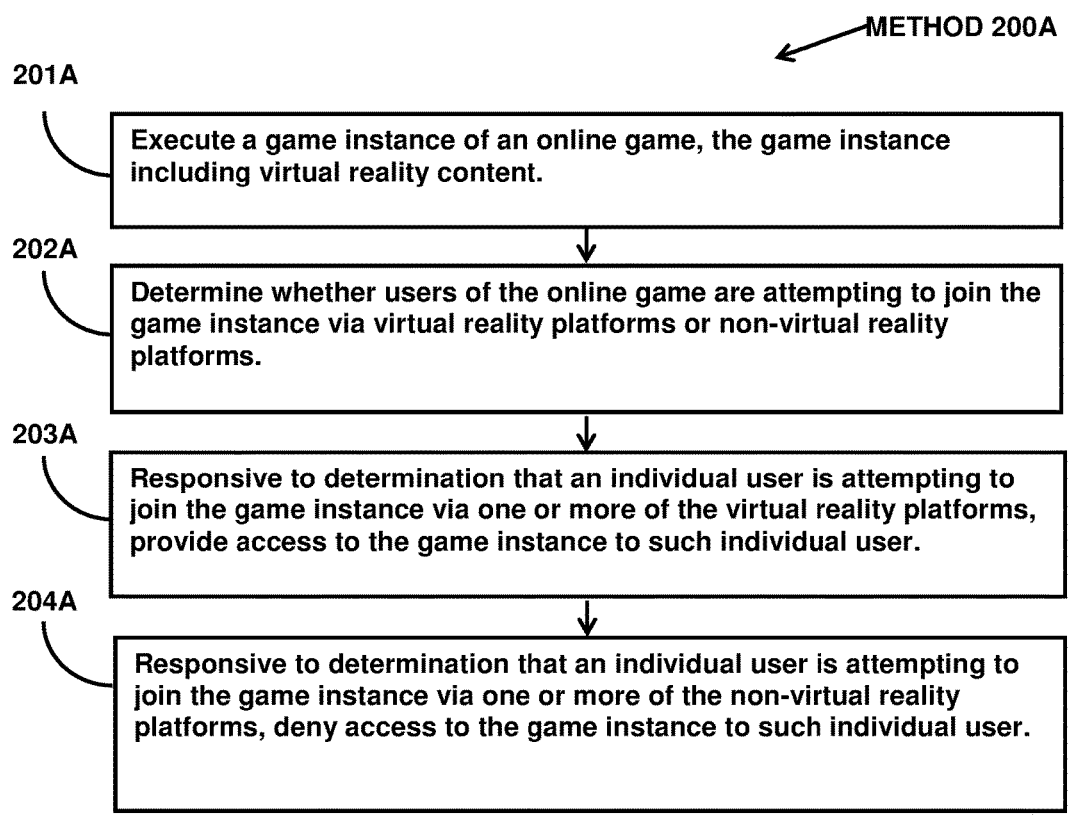
FIGS. 2A-2C illustrate methods for providing virtual reality content in an online game.
Figure 2B:
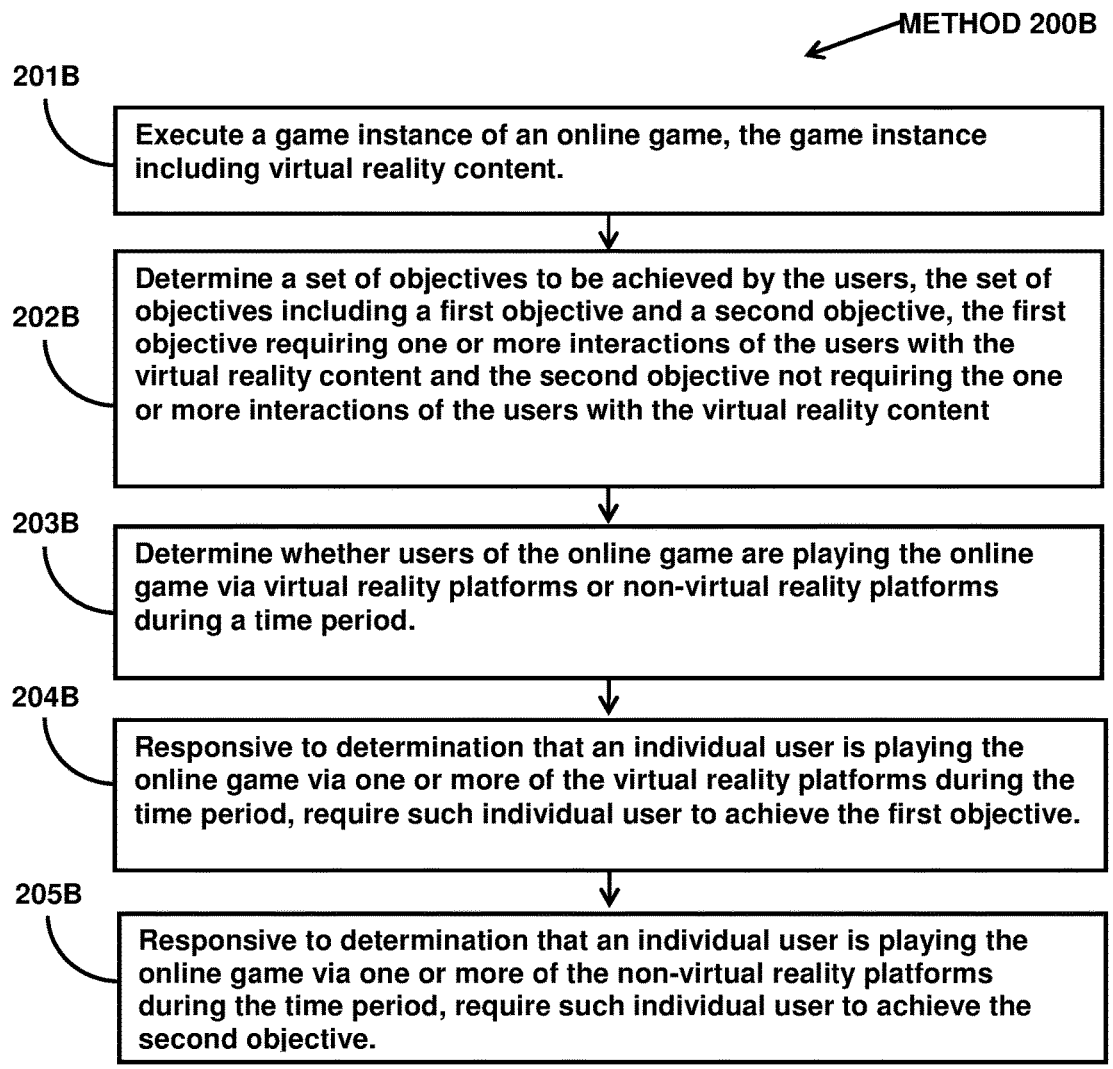
Figure 2C:
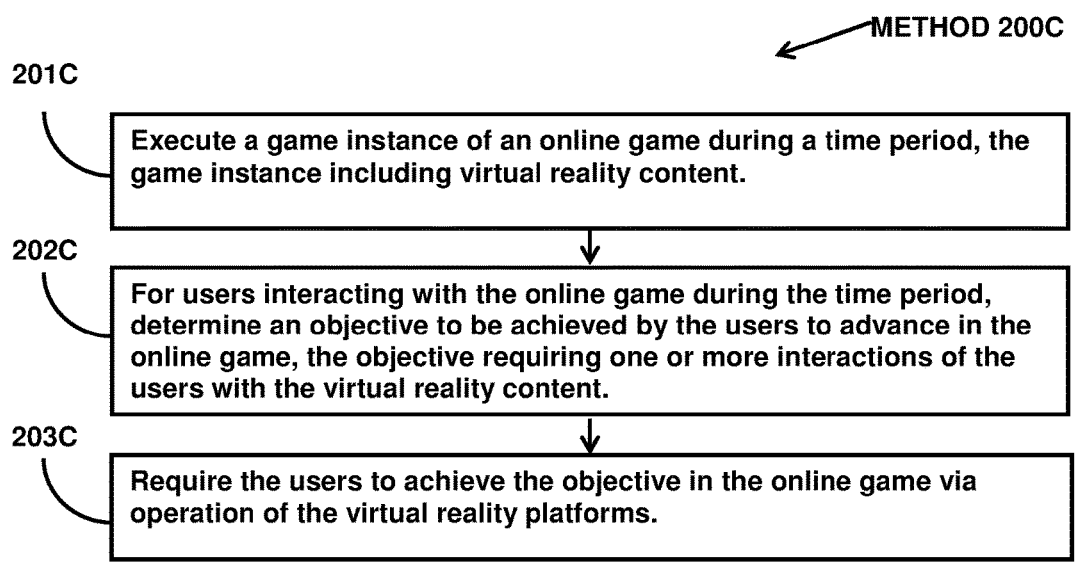

FIGS. 2A-2C illustrate methods 200A-C for providing virtual reality content in an online game. The operations of methods 200A-C presented below are intended to be illustrative. In some implementations, methods 200A-C may be accomplished with one or more additional operations not described, and/or without one or more of the operations discussed. In some implementations, two or more of the operations may occur substantially simultaneously.

In some implementations, methods 200A-C may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of methods 200A-C in response to instructions stored electronically on one or more electronic storage mediums. The one or more processing devices may include one or more devices configured through hardware, firmware, and/or software to be specifically designed for execution of one or more of the operations of methods 200A-C.

Referring to FIG. 2A and method 200A, at operation 201A, a game instance of an online game may be executed. The game instance may include virtual reality content. In some implementations, operation 201A may be performed by a processor component the same as or similar to game instance component 102A (shown in FIG. 1A and described herein).

At operation 202A, whether users of the online game are attempting to join the game instance via virtual reality platforms or non-virtual reality platforms may be determined. In some implementations, operation 202A may be performed by a processor component the same as or similar to platform component 104A (shown in FIG. 1A and described herein).

At operation 203A, responsive to determination that an individual user is attempting to join the game instance via one or more of the virtual reality platforms, access to the game instance may be provided to such individual user. In some implementations, operation 203A may be performed by a processor component the same as or similar to access component 106A (shown in FIG. 1 and described herein).

At operation 204A, responsive to determination that an individual user is attempting to join the game instance via one or more of the non-virtual reality platforms, access to the game instance may be denied to such individual user. In some implementations, operation 204A may be performed by a processor component the same as or similar to access component 106A (shown in FIG. 1A and described herein).

Referring to FIG. 2B and method 200B, at operation 201B, a game instance of an online game may be executed. The game instance may include virtual reality content. In some implementations, operation 201B may be performed by a processor component the same as or similar to game instance component 102B (shown in FIG. 1B and described herein).

At operation 202B, a set of objectives to be achieved by the users may be determined. The set of objectives may include a first objective, a second objective, and/or other objectives. The first objective may require one or more interactions of the users with the virtual reality content and the second objective may not require one or more interactions of the users with the virtual reality content. In some implementations, operation 202B may be performed by a processor component the same as or similar to objectives component 108B (shown in FIG. 1B and described herein).

At operation 203B, whether users of the online game are playing the online game via virtual reality platforms or non-virtual reality platforms during a time period may be determined. In some implementations, operation 203B may be performed by a processor component the same as or similar to platform component 104B (shown in FIG. 1B and described herein).

At operation 204B, responsive to determination that an individual user is playing the online game via one or more of the virtual reality platforms during the time period, such individual user may be required to achieve the first objective. In some implementations, operation 204B may be performed by a processor component the same as or similar to VR objectives component 110B (shown in FIG. 1B and described herein).

At operation 205B, responsive to determination that an individual user is playing the online game via one or more of the non-virtual reality platforms during the time period, such individual user may be required to achieve the second objective. In some implementations, operation 205B may be performed by a processor component the same as or similar to non-VR objectives component 112B (shown in FIG. 1B and described herein).

Referring to FIG. 2C and method 200C, at operation 201C, a game instance of an online game may be executed during a time period. The game instance may include virtual reality content. In some implementations, operation 201C may be performed by a processor component the same as or similar to game instance component 102C (shown in FIG. 1C and described herein).

At operation 202C, for users interacting with the online game during the time period, an objective to be achieved by the users to advance in the online game may be determined. The objective may require one or more interactions of the users with the virtual reality content. In some implementations, operation 202C may be performed by a processor component the same as or similar to objectives component 108C (shown in FIG. 1C and described herein).

At operation 203C, the users may be required to achieve the objective in the online game via operation of the virtual reality platforms. In some implementations, operation 203C may be performed by a processor component the same as or similar to progress component 114C (shown in FIG. 1C and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing virtual reality content in an online game, the system comprising:
    one or more physical processors configured by machine readable instructions to:
        execute a game instance of the online game, the game instance including the virtual reality content, and use the game instance to generate game state information that is transmitted to client computing platforms over a network, the game state information facilitating presentation of views of the online game to users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms;
        determine whether the users of the online game are attempting to join the game instance via the virtual reality platforms or the non-virtual reality platforms;
        responsive to determination that an individual user is attempting to join the game instance via one or more of the virtual reality platforms, provide access to the game instance to such individual user; and
        responsive to determination that an individual user is attempting to join the game instance via one or more of the non-virtual reality platforms, deny access to the game instance to such individual user.

2. The system of claim 1, wherein the one or more physical processors are further configured by machine readable instruction to:
    execute another game instance of the online game, the other game instance not including the virtual reality content; and
    responsive to the determination that the individual user is attempting to join the game instance via the one or more of the non-virtual reality platforms, provide access to the other game instance to such individual user.

3. The system of claim 1, wherein the game instance of the online game is executed during a time period.

4. The system of claim 3, wherein the time period includes a duration within 5 PM to 11 PM for a time zone in which the most number of users are located.

5. The system of claim 1, wherein the game instance of the online game includes a set of rewards for users interacting with the online game via the one or more of the virtual reality platforms, and the one or more physical processors are further configured by machine readable instruction to provide one or more rewards from the set of rewards to the users interacting with the online game via the one or more of the virtual reality platforms.

6. The system of claim 5, wherein the one or more rewards are provided to the users interacting with the online game via the one or more of the virtual reality platforms in response to the users joining the game instance via the one or more of the virtual reality platforms during a time period.

7. The system of claim 5, wherein the one or more rewards are provided to the users interacting with the online game via the one or more of the virtual reality platforms in response to the users interacting with the game instance via the one or more of the virtual reality platforms for a certain duration within a time period.

8. The system of claim 1, wherein the virtual reality platforms include a virtual reality headset display.

9. The system of claim 8, wherein the virtual reality platforms include a motion controller.

10. The system of claim 8, wherein the virtual reality platforms include a haptic generator.

11. A system for providing virtual reality content in an online game, the system comprising:
    one or more physical processors configured by machine readable instructions to:
        execute a game instance of the online game, the game instance including the virtual reality content, and use the game instance to generate game state information that is transmitted to client computing platforms over a network, the game state information facilitating presentation of views of the online game to users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms;
        determine a set of objectives to be achieved by the users, the set of objectives including a first objective and a second objective, the first objective requiring one or more interactions of the users with the virtual reality content and the second objective not requiring the one or more interactions of the users with the virtual reality content;

determine whether the users of the online game are playing the online game via the virtual reality platforms or the non-virtual reality platforms during a time period;

responsive to determination that an individual user is playing the online game via one or more of the virtual reality platforms during the time period, require such individual user to achieve the first objective in the online game via the one or more of the virtual reality platforms; and responsive to determination that an individual user is playing the online game via one or more of the non-virtual reality platforms during the time period, require such individual user to achieve the second objective in the online game via the one or more of the non-virtual reality platforms.

12. The system of claim 11, wherein the one or more physical processors are further configured by machine readable instruction to:

determine changes in the client computing platforms used by the users to interact with the online game during the time period;

responsive to determination that an individual user changed from playing the online game via the one or more of the virtual reality platforms to the one or more of the non-virtual reality platforms during the time period, cancel the first objective for such individual user and require such individual user to achieve the second objective in the online game via the one or more of the non-virtual reality platforms; and responsive to determination that an individual user changed from playing the online game via the one or more of the non-virtual reality platforms to the one or more of the virtual reality platforms during the time period, cancel the second objective for such individual user and require such individual user to achieve the first objective in the online game via the one or more of the virtual reality platforms.

13. The system of claim 11, wherein the first objective is characterized by a first game difficulty and the second objective is characterized by a second game difficulty, the first game difficulty being lower than the second game difficulty.

14. The system of claim 11, wherein the first objective is characterized by a first type of gameplay and the second objective is characterized by a second type of gameplay, the first type of gameplay differing from the second type of gameplay.

15. The system of claim 11, wherein the first objective is associated with a first reward and the second objective is associated with a second reward, and the one or more physical professors are further configured to:

responsive to determination that an individual user achieved the first objective, provide the first reward to such individual user; and responsive to determination that an individual user achieved the second objective, provide the second reward to such individual user.

16. A system for providing virtual reality content in an online game, the system comprising:

one or more physical processors configured by machine readable instructions to:

execute a game instance of the online game, the game instance including the virtual reality content, and use the game instance to generate game state information that is transmitted to client computing platforms over a network, the game state information facilitating presentation of views of the online game to users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms;

for users interacting with the online game during a time period, determine an objective to be achieved by the users to advance in the online game, the objective requiring one or more interactions of the users with the virtual reality content; and require the users to achieve the objective in the online game via operation of the virtual reality platforms.

17. The system of claim 16, wherein the one or more physical processors are further configured to:

determine whether the users of the online game are playing the online game via the virtual reality platforms or the non-virtual reality platforms during the time period; and responsive to determination that an individual user is playing the online game via one or more of the non-virtual reality platforms during the time period, effectuate presentation of an invitation to such user to change to one or more of the virtual reality platforms.

18. The system of claim 16, wherein the one or more physical processors are further configured to:

execute another game instance of the online game, the other game instance not including the virtual reality content;

determine whether the users of the online game are playing the online game via the virtual reality platforms or the non-virtual reality platforms during the time period; and responsive to determination that an individual user is playing the online game via one or more of the non-virtual reality platforms during the time period, provide access to the other game instance to such individual user.

* * * * *

UNITED STATES PATENT AND TRADEMARK OFFICE
CERTIFICATE OF CORRECTION

PATENT NO. : 9,919,218 B1
APPLICATION NO. : 15/048958
DATED : March 20, 2018
INVENTOR(S) : Kent Wakeford Page 1 of 1

It is certified that error appears in the above-identified patent and that said Letters Patent is hereby corrected as shown below:

In Column 9 at Line 5, Change "portion," to --potion,--.

In Column 17 at Line 19, Change "1106" to --110B--.

In Column 17 at Line 25, Change "1106" to --110B--.

In Column 17 at Line 46, Change "1106" to --110B--.

In Column 25 at Line 52 (Approx.), In Claim 15, change "professors" to --processors--.

Signed and Sealed this
Thirty-first Day of July, 2018

Andrei Iancu
*Director of the United States Patent and Trademark Office*